United States Patent Office 3,046,747
Patented July 31, 1962

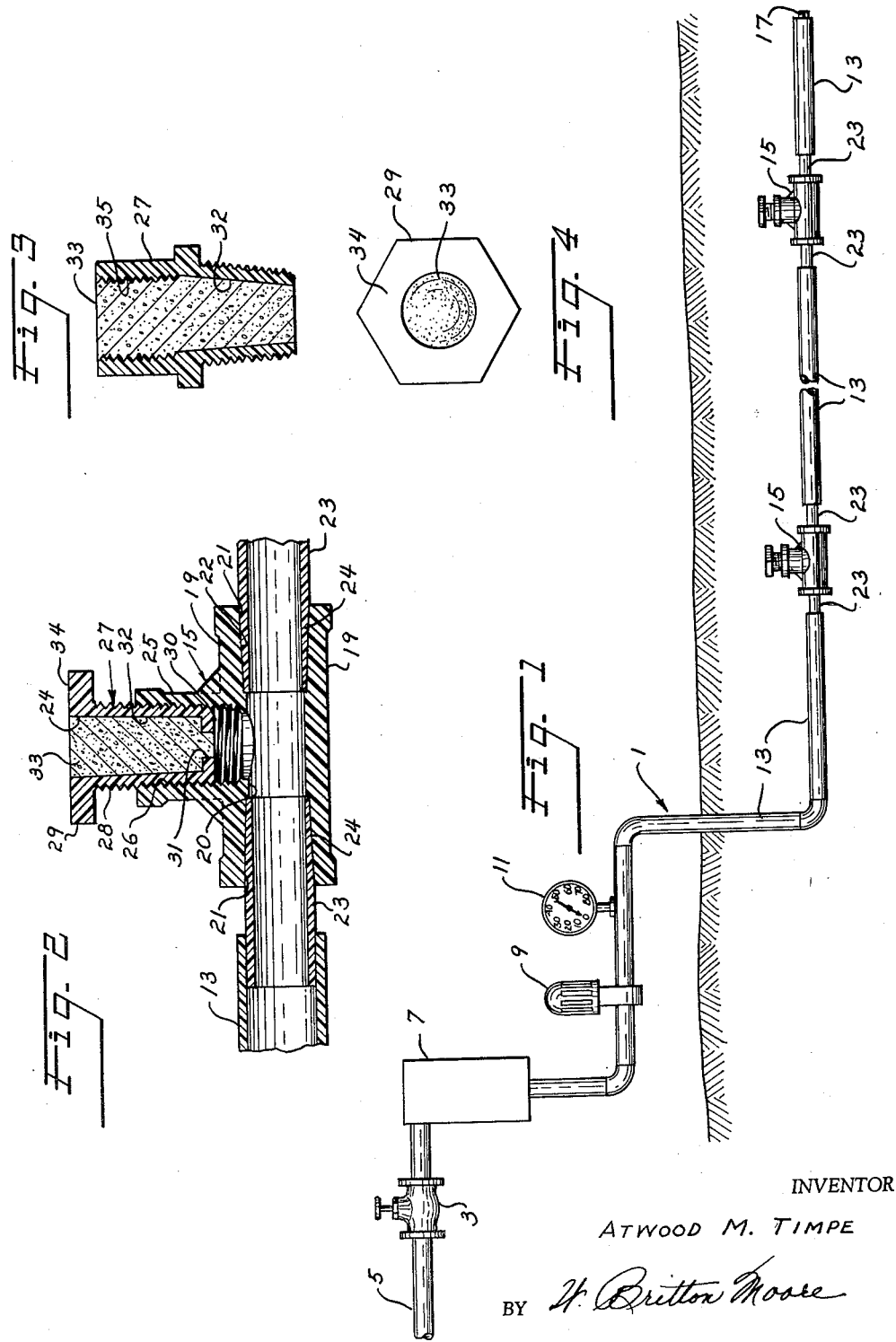

3,046,747
SUBTERRANEAN IRRIGATION
Atwood M. Timpe, 5149 Parkglen Ave.,
Los Angeles 43, Calif.
Filed Jan. 29, 1959, Ser. No. 789,827
7 Claims. (Cl. 61—13)

The present invention relates to an underground irrigation system, and more particularly to an improved irrigation system adapted to provide a continuous seepage of water beneath the surface of the ground.

The most efficient way to irrigate soil is by introducing water beneath the surface. In this way it not only requires less water, but the water is supplied where it does the most good. The advantages of this type of irrigation are well-known and a number of systems have been proposed, although none has met with any measurable degree of success.

One of the principal objections to an underground irrigation system is the close control which must be maintained over the water discharge. Prior systems have used intermittent discharge of the water, but have proved to be unsatisfactory because of the difficulty in distributing water underground, and the resultant localized subterranean flooding which reduce the effectiveness of these systems.

In any system including underground water circulating pipes, the problem of roots entering the system has always been a source of trouble. Where the irrigation system pipes have water outlet openings, the problem is difficult to overcome. In the past, it has been necessary to periodically drain the systems when not in use to prevent the roots from entering the pipes through the discharge openings and clogging the systems.

Another disadvantage of the systems presently in use is their susceptibility to changes in ambient temperature. In long runs of pipe any change in temperature will produce a corresponding elongation or contraction in the pipe lengths. If the components of the system are rigidly coupled such temperature changes frequently cause breaks in the line which are difficult to locate and costly to repair.

Accordingly, it is an object of this invention to provide an improved underground irrigation system which is not subject to the disadvantages and limitations mentioned above.

A further object is the provision of a subterranean irrigation system wherein moisture is released in drop form and spreads out below the surface in a capillary action being first attracted to the less dense soil but not releasing enough moisture to disturb the soil salts so as to cause the latter to rise to the surface.

Another object is to provide an underground irrigation system having a constant controlled flow of water.

Still another object is to provide an underground irrigation system which is impervious to penetration of roots and particles of soil.

A further object is to provide an underground irrigation system which is flexible, light in weight and low in cost.

A still further object is to provide an underground irrigation system having interchangeable water discharge and filtering means which slowly releases liquid for irrigating or fertilizing purposes into the soil so that the latter becomes thoroughly moistened without flooding thereof.

Still another object is the provision of an irrigation system embodying pipes with porous filters associated with the pipe discharge outlets which prevent the latter from becoming clogged, and yet insure of an even and slow discharge of liquid therethrough so that the subterranean soil is not completely saturated or washed away and fine root growths disturbed.

A further object is to provide an improved subterranean irrigation and/or fertilizing system incorporating a series of replaceable and interchangeable porous filter plugs in the spaced pipe couplings and outlet openings for insuring the desired control of liquid therethrough.

A further object is the provision of an improved subterranean irrigation system wherein the liquid circulating pipes are provided with spaced filtering outlet means which causes dirt and sediment to settle in the bottom of the pipes for ready flushing.

Still another object is the provision of a subterranean pipe system wherein the novel filter units associated with the pipe couplings and discharge openings are easily accessible for repair and replacement purposes without the necessity of disturbing or removing the pipes.

A further object is to provide a subterranean irrigation pipe system wherein moisture is released in controlled drop form under the surface which curtails objectionable below surface root cultivation, because the moisture is maintained below the surface so that the weed seed on the surface will lay dormant.

According to a preferred embodiment of the invention, these objects are realized in a system of plastic pipes equipped with fittings having interchangeable foamed plastic filtering inserts. The foamed plastic inserts contain a myriad of tiny interconnected cells which permit a slow controlled discharge of liquid therethrough, the discharge being directly proportional to foam density.

This preferred embodiment of the invention is illustrated in the accompanying drawings in which:

FIGURE 1 is a diagrammatic view of a simple system embodying details of the present invention;

FIGURE 2 is a cross-sectional view of a T type fitting having one embodiment of foamed plastic insert mounted therein;

FIGURE 3 is a cross-sectional view of a second embodiment of a foamed plastic insert; and FIGURE 4 is a bottom view of the embodiment of FIGURE 3.

Referring now to FIGURE 1 of the drawings, an irrigation system is shown installed beneath the surface of the ground, generally designated by the numeral 1. The system comprises a main valve 3 serially connected to a supply line 5 which extends from a suitable and conventional water source, not shown.

In series with the main valve 3 and supply line 5 is a suitable filter 7. While this filter is not absolutely necessary for the operation of the system, it prevents the entrance of sediment which would clog the system and thus enhances the performance characteristics of the system, particularly when distributing materials such as weed killers or fertilizers therethrough.

Since the source of water supply is usually under relatively high pressure, it is often necessary to reduce this pressure and to control it accurately to maintain the proper water discharge. This reduction in pressure and control is made possible by means of a suitable and conventional throttling valve 9. A suitable and conventional pressure gauge 11 may also be found desirable to indicate the system pressure, which in turn controls the fluid being circulated therethrough.

A plurality of pipes 13 form the underground conduits for the system, and these pipes are made from a suitable thermoplastic having the requisite physical characteristics. Such pipes will not rot, rust or damage, and are easily repaired or replaced.

The various sections of pipe 13 are connected together by couplings 15 which may be formed of the same material as the pipes 13 and are installed with the pipe sections at any desired depth below surface, depending upon the type of soil to be irrigated, but this depth probably normally would not exceed eighteen inches.

As shown in FIGURES 2 and 3, each coupling 15 consists of a standard T pipe fitting 19 having the usual transverse through bore 20, the opposing ends 21 of which are slightly inwardly tapered, as at 22, to snugly accommodate the tapered ends 24 of relatively short pipe sleeve sections 23. The opposing ends of the sleeves 23 are likewise snugly seated in the open ends of the main pipes 13. It will, of course, be understood that the sleeve sections 23 may be omitted, in which event the ends of the pipes 13 will be directly connected to respective fittings 19 in an obvious manner. Each fitting 19 is also provided with a lateral extension 25 having an internally threaded bore 26 extending therethrough which communicates with main transverse bore 20.

A hollow cylindrical cartridge filter unit 27, of the same thermoplastic material as outlet fitting 19, is formed with external threads 28 for threadedly engaging the internal threads 26 of the lateral extension 25. In the preferred embodiment shown in FIG. 2, the filter unit 27 is formed with an annular flange 29 at its upper end, and the lower end wall 30 of unit 27 is formed with a reduced opening 31 extending therethrough and communicating with an annular chamber 32 which is filled with a core of foamed plastic material 33 having a very large number of interconnected cells. The plastic 33 is preferably of the isocyanate family, although not limited thereto, and the density of the cellular structure, which is carefully controlled during manufacture, determines the rate at which moisture seeps upwardly therethrough. When the cartridge 27 is filled with plastic 33, the same is caused to be coextensive with the flat upper end 34 of the cartridge and to completely fill the chamber 32 and opening 31 in the lower end thereof so as to be firmly retained in position therewithin. By using the desired manufacturing process, which does not constitute a part of this invention, the plastic is mixed to a thick creamy consistency and poured into the chamber 32 of each fitting 19 and cured at room temperature so as to be snugly molded within chamber 32. After setting, the opposing ends of the body of plastic 33 may be buffed or otherwise treated so that these ends will be coextensive with the ends of the cartridge and will permit the seepage of fluid into the lower end of the plastic body and thence upwardly therethrough to be discharged in the form of drops or globules from the upper end thereof and into the surrounding soil. It has been found that for most irrigation purposes, it is desirable to cause the liquid to seep upwardly through the plastic filled cartridges so as to be discharged from the upper end thereof at a rate of from five to twenty drops of water per minute, which is controlled by the liquid pressure in the pipes. Such a slow controlled rate permits constant operation of the system, without producing localized flooding of the soil adjacent the respective outlets. That is, the slow seepage of fluid through the plastic causes the soil to be moistened without being completely saturated and thereby washed away, as would occur if a constant and uninterrupted flow of fluid passed through each fitting. The porous nature of plastic 33 enables this previously described desired seepage of fluid therethrough and yet the plastic 33 is firm and somewhat semi-rigid and of such a consistency as to preclude foreign material, such as roots and particles of soil, from entering and clogging up the plastic. The term "semi-rigid" is intended to mean that the plastic foam materials are made from the same polymers as rigid foams but are usually lower in density and possess properties between those of rigid and flexible foams so as to have some degree of resiliency.

It will be understood that the cartridge units 27 may assume various shapes, as this invention essentially resides in the arrangement of removable, replaceable and interchangeable porous plastic filled cartridges within the spaced connecting pipe couplings or fittings 19. For example, as shown in FIGURE 3, the cartridge unit 37 may have the annular flange 29 and bottom apertured wall 30 omitted therefrom so that the plastic core 33 entirely fills the chamber 32, and the externally threaded lower end 28 thereof is threaded into the lateral extension 25 of the fitting. Furthermore, the upper end of the filter cartridge may be internally threaded, as at 35, to additionally anchor the plastic core 33 therein. It may also be desirable to make the upper and lower ends of the cartridge the same diameter and shape and to externally thread both ends, so that either end of the cartridge may be interchangeably threaded into the lateral extension 25 of the fitting, in an obvious manner not shown. Additionally, in some instances, it may be preferable to form the reduced opening 31 in the upper end of the cartridge so that the lower end of the cartridge is completely exposed to flow of water. Thus, the outlet end of the cartridge, where the plastic interlocks with the opening, will be more dense or have a denser cell structure, because the discharge of fluid through the upper end will be slower and will thereby not create enough suction at the lower inlet end thereof so as to soak up any heavy foreign material from the liquid. Consequently, foreign material will tend to collect on the lower or inlet end of the porous core and flushing of the pipe lines will remove the same therefrom. It may also be possible to omit the external threads from the cartridge, in which event, the cartridges would be cemented, or otherwise anchored in the fittings.

From the foregoing, it will be apparent that the system of pipes are positioned in the soil to be irrigated at the desired distance, usually approximately eight inches, below the surface thereof, and the pipes and associated spaced fittings are covered by soil so as to be entirely concealed and embedded therewithin. While the pipe couplings and discharge fittings may be varyingly spaced along the pipe sections, depending on the area to be irrigated, it has been found that the same can be spaced approximately three feet apart with the upper ends of the cartridges approximately five inches below the surface. During operation, liquid flows through the pipe sections and seeps upwardly through the spaced cartridges and discharges through the upper ends thereof in the form of drops or globules, as distinguished from spray, so that the surrounding soil will be dampened or moistened without becoming so saturated as to erode or wash away. It is evident that the fittings and/or cartridges may be readily removed, replaced, or interchanged without disturbing the main system.

While I have shown and described a preferred embodiment of my subterranean irrigation system, it is to be understood that various changes and improvements may be made therein, without departing from the scope and spirit of the appended claims.

What I claim is:

1. An underground irrigation system comprising a source of water, a plurality of pipes connected to said source, and a plurality of water discharge cartridges located in said pipes, said cartridges comprising a semi-rigid foamed plastic having an interconnected cellular structure of a size such that water will seep through said cartridges and be discharged in the form of drops into the soil.

2. An underground system comprising a source of water, a plurality of pipes connected to said source, and a plurality of water discharge cartridges located in said pipes, said cartridges comprising hollow shell members substantially filled with a semi-rigid foamed plastic having and interconnected cellular structure of a size such that water will seep through said cartridges and be discharged in the form of drops into the soil.

3. An underground irrigation system comprising a source of water, a plurality of pipes connected to said source, and a plurality of water discharge cartridges located in said pipes, said cartridges comprising externally threaded hollow shell members filled with a semi-rigid foamed plastic having an interconnected cellular structure of a size such that water will seep through said cartridges and be discharged in the form of drops into the soil.

4. In a subterranean irrigation system, a source of fluid, a series of pipe sections, pipe fittings interconnecting said sections, said fittings having lateral open ended chambers therein, semi-rigid foamed plastic porous material members having an interconnected cellular structure arranged in and substantially filling said chambers and of such a size that fluid in said sections will seep through said porous members and be discharged in the form of drops into the soil.

5. In a subterranean irrigation system, a source of fluid, a series of pipe sections, spaced pipe fittings interconnecting said sections, said fittings having lateral open ended fluid passage chambers therein, substantially cylindrical semi-rigid foamed plastic porous material members having an interconnected cellular structure arranged in and substantially filling said chambers and of a size such that fluid in said sections will seep through said porous members and be discharged in the form of drops into the soil.

6. In a subterranean irrigation system, a source of fluid under pressure, valve controls therefor, a series of pipe sections, spaced pipe fittings interconnecting said sections, said fittings having lateral open ended fluid passage chambers therein, said chambers being substantially filled with semi-rigid foamed plastic porous material having an interconnected cellular structure of such a size that fluid under pressure in said sections will seep through said porous members and be discharged in the form of drops into the soil.

7. In a subterranean irrigation system, a source of fluid under pressure, valve controls therefor, a series of pipe sections, spaced pipe fittings interconnecting said sections, said fittings having transverse passages therethrough, and lateral open ended fluid passage chambers in said fittings communicating with said transverse passages, said chambers being substantially filled with semi-rigid porous material having an interconnected cellular structure of such a size that fluid in said transverse passages will seep through said porous members and be discharged in the form of drops into the soil.

References Cited in the file of this patent
UNITED STATES PATENTS

| | | |
|---|---|---|
| 644,703 | Buckley | Mar. 6, 1900 |
| 1,401,386 | Woodberry | Dec. 27, 1921 |
| 1,492,941 | Sherman et al. | May 6, 1924 |
| 2,297,248 | Rudolph | Sept. 29, 1942 |
| 2,361,818 | Brightwell | Oct. 31, 1944 |
| 2,798,768 | Babin | July 9, 1957 |
| 2,923,034 | Dickie | Feb. 2, 1960 |